United States Patent
Kreiner et al.

(10) Patent No.: US 7,899,500 B2
(45) Date of Patent: *Mar. 1, 2011

(54) APPARATUS AND METHOD FOR PROVIDING HANDS-FREE OPERATION OF A DEVICE

(75) Inventors: Barrett M. Kreiner, Woodstock, GA (US); Joseph E. Page, Jr., Suwanee, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/639,483

(22) Filed: Dec. 15, 2006

(65) Prior Publication Data

US 2007/0135187 A1   Jun. 14, 2007

Related U.S. Application Data

(63) Continuation-in-part of application No. 11/354,198, filed on Feb. 14, 2006, now Pat. No. 7,542,787.

(51) Int. Cl.
*H04M 1/00* (2006.01)
(52) U.S. Cl. .................. 455/569.1; 455/557; 455/575.2
(58) Field of Classification Search .............. 455/569.1, 455/557, 575.2, 569.2
See application file for complete search history.

(56) References Cited

U.S. PATENT DOCUMENTS

| | | | |
|---|---|---|---|
| 3,617,640 A * | 11/1971 | Cichanowicz | ................ 379/40 |
| 4,340,797 A | 7/1982 | Takano et al. | |
| 4,506,142 A | 3/1985 | Takano et al. | |
| 4,935,951 A | 6/1990 | Robinson et al. | |
| 4,993,058 A | 2/1991 | McMinn et al. | |
| 5,012,507 A | 4/1991 | Leighton et al. | |
| 5,161,180 A | 11/1992 | Chavous | |
| RE34,677 E | 7/1994 | Ray et al. | |
| 5,487,175 A * | 1/1996 | Bayley et al. | ............. 455/422.1 |
| 5,511,111 A | 4/1996 | Serbetcioglu et al. | |
| 5,526,406 A | 6/1996 | Luneau | |
| 5,584,054 A * | 12/1996 | Tyneski et al. | ............... 455/566 |
| 5,621,379 A | 4/1997 | Collins | |
| 5,673,304 A | 9/1997 | Connor et al. | |
| 5,724,412 A | 3/1998 | Srinivasan | |
| 5,726,984 A * | 3/1998 | Kubler et al. | ............... 370/349 |
| 5,796,806 A | 8/1998 | Birckbichler | |

(Continued)

OTHER PUBLICATIONS

Motorola, Digital DNA, Product Brief, MC9328MX1P/D, Ref. 2, Feb. 2002 and MC9328MX1 (Dragon Ball™ MX1) Integrated Portable System processor, pp. 1-11.

(Continued)

*Primary Examiner*—Minh D Dao
(74) *Attorney, Agent, or Firm*—Scott P. Zimmerman, PLLC

(57) ABSTRACT

In exemplary embodiments, a hands-free adapter provides hands-free operation of a device. The adapter communicates with the device, and in some embodiments, with a headset. The hands-free adapter allows a user to use voice commands so that the user does not have to handle the device. The hands-free adapter receives voice commands from the headset and translates the voice commands to commands recognized by the device. The hands-free adapter also monitors the device to detect device events and provides notice of the events to the user.

19 Claims, 9 Drawing Sheets

U.S. PATENT DOCUMENTS

| | | | |
|---|---|---|---|
| 5,805,587 | A | 9/1998 | Norris et al. |
| 5,883,942 | A | 3/1999 | Lim et al. |
| 5,913,163 | A * | 6/1999 | Johansson ................ 455/426.1 |
| 5,940,474 | A | 8/1999 | Ruus |
| 5,940,475 | A | 8/1999 | Hansen |
| 5,978,689 | A * | 11/1999 | Tuoriniemi et al. ...... 455/569.1 |
| 6,009,148 | A | 12/1999 | Reeves |
| 6,011,473 | A | 1/2000 | Klein |
| 6,104,800 | A | 8/2000 | Benson |
| 6,122,486 | A * | 9/2000 | Tanaka et al. ................. 455/68 |
| 6,144,644 | A | 11/2000 | Bajzath et al. |
| 6,208,718 | B1 | 3/2001 | Rosenthal |
| 6,208,726 | B1 | 3/2001 | Bansal et al. |
| 6,219,413 | B1 | 4/2001 | Burg |
| 6,223,029 | B1 * | 4/2001 | Stenman et al. ............. 455/420 |
| 6,233,464 | B1 * | 5/2001 | Chmaytelli ............. 455/556.2 |
| 6,259,692 | B1 | 7/2001 | Shtivelman |
| 6,307,920 | B1 | 10/2001 | Thomson et al. |
| 6,310,946 | B1 | 10/2001 | Bauer et al. |
| 6,339,706 | B1 * | 1/2002 | Tillgren et al. .............. 455/419 |
| 6,343,115 | B1 | 1/2002 | Foladare et al. |
| 6,347,136 | B1 | 2/2002 | Horan |
| 6,356,756 | B1 | 3/2002 | Koster |
| 6,434,126 | B1 | 8/2002 | Park |
| 6,476,763 | B2 | 11/2002 | Allen, Jr. |
| 6,487,240 | B1 * | 11/2002 | Chen ......................... 375/219 |
| 6,529,500 | B1 | 3/2003 | Pandharipande |
| 6,584,439 | B1 | 6/2003 | Geilhufe et al. |
| 6,603,977 | B1 | 8/2003 | Walsh et al. |
| 6,608,886 | B1 | 8/2003 | Contractor |
| 6,622,016 | B1 | 9/2003 | Sladek et al. |
| 6,624,754 | B1 | 9/2003 | Hoffman et al. |
| 6,661,785 | B1 | 12/2003 | Shang et al. |
| 6,665,388 | B2 | 12/2003 | Bedingfield |
| 6,665,611 | B1 | 12/2003 | Oran et al. |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,690,947 | B1 * | 2/2004 | Tom ......................... 455/556.1 |
| 6,703,930 | B2 | 3/2004 | Skinner |
| 6,718,021 | B2 | 4/2004 | Crockett et al. |
| 6,748,244 | B2 * | 6/2004 | Odinak .................... 455/569.2 |
| 6,771,742 | B2 | 8/2004 | McCalmont et al. |
| 6,792,081 | B1 | 9/2004 | Contractor |
| 6,804,338 | B1 | 10/2004 | Chen |
| 6,842,448 | B1 | 1/2005 | Norris et al. |
| 6,868,074 | B1 | 3/2005 | Hanson |
| 6,912,399 | B2 | 6/2005 | Zirul et al. |
| 6,940,950 | B2 | 9/2005 | Dickinson et al. |
| 2002/0016188 | A1 * | 2/2002 | Kashiwamura ............. 455/568 |
| 2002/0025832 | A1 * | 2/2002 | Durian et al. ............... 455/556 |
| 2002/0072348 | A1 | 6/2002 | Wheeler et al. |
| 2002/0160745 | A1 | 10/2002 | Wang |
| 2002/0181691 | A1 * | 12/2002 | Miller et al. ................. 379/234 |
| 2003/0022701 | A1 * | 1/2003 | Gupta ......................... 455/566 |
| 2003/0032449 | A1 * | 2/2003 | Giobbi ....................... 455/556 |
| 2003/0211839 | A1 | 11/2003 | Baum et al. |
| 2003/0216148 | A1 | 11/2003 | Henderson |
| 2004/0037403 | A1 | 2/2004 | Koch |
| 2004/0057425 | A1 | 3/2004 | Brouwer et al. |
| 2004/0101123 | A1 | 5/2004 | Garcia |
| 2004/0140928 | A1 | 7/2004 | Cleghorn |
| 2004/0185915 | A1 * | 9/2004 | Ihara et al. ................. 455/569.1 |
| 2004/0219954 | A1 * | 11/2004 | Odinak .................... 455/569.1 |
| 2005/0047574 | A1 | 3/2005 | Reid |
| 2005/0063519 | A1 | 3/2005 | James |
| 2005/0151642 | A1 | 7/2005 | Tupler et al. |
| 2005/0175166 | A1 | 8/2005 | Welenson et al. |
| 2005/0190750 | A1 | 9/2005 | Kafka et al. |
| 2005/0190892 | A1 | 9/2005 | Dawson et al. |
| 2005/0232243 | A1 | 10/2005 | Adamczyk |
| 2005/0250468 | A1 | 11/2005 | Lu |

OTHER PUBLICATIONS

U.S. Appl. No. 11/318,110, filed Dec. 2005.
US 5,905,788, 05/1999, Bauer et al. (withdrawn)

* cited by examiner

| | Voice command | Device Command/Action |
|---|---|---|
| 602 | Pick Up | Answer incoming call |
| 604 | Hang Up | Disconnect current call |
| 606 | Joe | XXX○XXX ○XXXX |
| 608 | Hair Salon | YYY○YYY○YYYY |
| 610 | Dial | Wait for digits or voice command and dial |
| 612 | Ignore | Ignore event |
| 614 | Okay | Send |
| 616 | Voice mail | Answer incoming call and Send to voice mail |
| 618 | Create entry directory | Create new voice command |
| 620 | Sleep | Enter sleep mode |
| 622 | Wake up | Exit sleep mode |
| 624 | Stop | Discontinue Command/Action |
| 626 | Record | Record Audio |
| 628 | Activate | Power On |
| 630 | Deactivate | Power Off |
| 632 | Hang Up | Disconnect Communications |
| 640 | Unrecognized voice command | Prompt for associated voice command |

FIG. 6

| Event | Event Indicator |
|---|---|
| Incoming Call | Play "incoming call" announcement |
| Incoming call Waiting | Play "incoming call Waiting" announcement |

FIG. 7

| Voice Command | Device Command/Action |
|---|---|
| Read | Open message and read it |
| Reply | Reply to message |
| Delete | Delete message |
| Joe | Joe@ipager.com |
| Activate | Power on |
| Deactivate | Power off |
| Forward | Forward message |
| Copy | Send copy of reply to different address |

FIG. 8

| Event | Event Indicator |
|---|---|
| New message | Play "new message" announcement |

APPARATUS AND METHOD FOR PROVIDING HANDS-FREE OPERATION OF A DEVICE

CROSS REFERENCE TO RELATED APPLICATION

This application is a continuation-in-part of commonly assigned U.S. patent application Ser. No. 11/354,198, now issued as U.S. Pat. No. 7,542,787 and incorporated herein by this reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to providing hands-free operation of a device, and more particularly, to providing voice commands that emulate a user's interaction with the device.

Mobile devices, such as mobile telephones, pagers and personal digital assistants ("PDAs"), have made it easier to reach users. Users of the devices typically carry the devices with them allowing a caller or sender to reach a user regardless of the user's location. However, there are times when a user misses a communication because interacting with the device is inconvenient or impossible. If a user is performing a task that requires both hands, then the user may not be able to interact with a device to receive a communication. For example, if a parent is grocery shopping with a couple of children, the parent may be using both hands to control the children and the grocery cart and may not be able to handle a mobile telephone to answer an incoming call. Similarly, if a mobile telephone is carried in a purse or a backpack, the user may not be able to locate and answer the telephone before the caller hangs up, especially if the user is also driving a vehicle when the telephone rings.

Although there are currently some solutions that allow a user to use a mobile telephone without having to hold the telephone, these solutions still require the user to interact with the telephone. For example, one solution provides a headset or a speakerphone function so that the user does not have to hold the mobile telephone during a conversation. However, the user is still required to interact with the mobile telephone to receive, end or initiate a telephone call.

Another solution is an auto-dialer that allows a user to dial a telephone number by speaking the number. However, most auto-dialers require that the user place a call using the keypad of the mobile telephone to a remote server. Typically the auto-dialing service is provided by a network element and the user is required to subscribe to the service before using the service.

Thus, there is a need for providing an apparatus and method that supports completely hands-free operation of a device.

SUMMARY

The exemplary embodiments address the above needs and other needs by providing a hands-free adapter that supports hands-free operation of a device. Unlike other solutions that require the user to initially interact with the device, the hands-free adapter is active whenever the device is powered so that the hands-free adapter can be used to perform any function or command that is normally performed by the user interacting with the device.

In accordance with some of the embodiments, the hands-free adapter includes a device interface for interfacing and communicating with the device. For example, the device interface may connect the hands-free adapter with a mobile telephone, a pager, a personal digital assistant ("PDA"), and other devices. Further, the device interface provides information about the status, functionality, and capabilities of the device and communicates audio, video, and data with the hands-free adapter.

The hands-free adapter also includes memory. The memory stores command prefixes, voice commands, event indicators, and other data. According to some of the embodiments, a command prefix is a word, phrase, and or audible sound (e.g., a whistle) that provides an alert that a subsequent word or phrase is a command to control the device. For example, the command prefix may be a word that is not commonly used in conversation, such as "Goober." In other exemplary embodiments, the command prefix may be a change in speaking rhythm or pitch, a non-speech sound, or even a pause in the user's speech. According to still further exemplary embodiments, the command to control the device may be selected by the user. An example of a voice command may be "pick-up," "answer," "hello," or another expression that indicates an affirmative decision by the user to accept and establish a connection with an incoming communication. That is, for example, when the user says "goober, pick-up" the hands-free adapter sends a device command to the device to answer the incoming communication. According to still further exemplary embodiments, an event of interest identifies an event indicator selected by the user for receiving information about the device. An example of an event indicator is an alert, such as, for example, a special tone or "sparkle" that is presented when the device receives an incoming communication (e.g., an incoming telephone call, an incoming email, an incoming text message, etc.). The memory also stores any software that is needed to operate the hands-free adapter, such as voice recognition software.

In addition, the hands-free adapter includes a digital signal processor ("DSP") and may also include a headset interface. The DSP and/or the headset interface processes audio, video, and/or data communications from a user and establishes a communications connection with the device. For example, the headset may detect audio signals that are then processed by the DSP to identify voice commands. If the audio signals are part of a telephone conversation, then the audio signals are passed through to the device. However, if the audio signals correspond to a voice command, then the voice command is recognized by the DSP and is processed accordingly. The DSP may also provide event indicators to the hands-free adapter and/or to the headset. If the user selects an event indicator message that requires the generation of speech, then the DSP performs the voice synthesis. The interface between the hands-free adapter and the headset can be a wireless or a wired interface.

The hands-free adapter may include an optional computer interface. The computer interface allows the hands-free adapter to communicate with a computer using any of a variety of well-known protocols. The computer interface may be used to configure and "train" the hands-free adapter for voice recognition. The computer interface may also be used to transfer user preference information from one hands-free adapter to another hands-free adapter, to back up the user preference information or to upgrade the features of the hands-free adapter. Configuration of the hands-free adapter includes programming user preferences into the memory. User preferences include a personal directory that associates an identifier, such as a name, with a destination, such as a telephone number or pager address. User preferences also include the selection of other voice commands and event indicators.

The hands-free adapter can be connected to the device using a wired or a wireless interface. The hands-free adapter can be a separate device that is connected to the device or can be integrated into the device. The headset used with the hands-free adapter includes a speaker and a microphone. The headset can be a conventional headset or can be integrated into another article, such as, for example a pair of glasses, a glasses' strap, a hat, or a vehicle. Alternatively, the headset may be integrated with the hands-free adapter.

The hands-free adapter monitors the device via the device interface. Whenever the device interface detects an event of interest, the device interface notifies the user by sending an event indicator to the hands-free adapter. For example, the event indicator may be a message, such as a message previously recorded by the user or a standard message, or a tone or series of tones. According to further embodiments, the event indicator may be overlaid and presented to the hands-free adapter (or headset) during an established communications connection. And, the presentation of the event indicator during an established communication may be only presented to the user of the hands-free adapter and not to another party on the communications connection.

The hands-free adapter monitors the headset via the headset interface. Whenever the hands-free adapter detects the voice command, the voice command is deciphered and the device interface communicates a device command to the device. According to exemplary embodiments, the voice command includes a command prefix and a command to control the device. The command prefix may be provided by the manufacturer or may be selected by the user. For example, the command prefix may be a word that the user does not use in conversation. To issue a command, the user says both the command prefix and a command. When the hands-free adapter detects the command prefix, the hands-free adapter treats the next word as a command. In addition, if the hands-free adapter is passing audio signals to the device, then the hands-free adapter mutes the audio to the device, so that the voice command is not provided to the device. The command prefix allows the user to use a voice command in conversation without triggering a device command because the voice command is only effective if the voice command is preceded by the command prefix. Alternatively, the hands-free adapter may use context to recognize a command without the use of a command prefix.

The hands-free adapter can also provide additional functions to the user. For example, a hands-free adapter communicating with a cellular phone may provide caller identification and voice mail to the user. If the hands-free adapter detects an incoming call from one of the telephone numbers stored in its memory, then the hands-free adapter identifies the caller to the user. Voice mail can be provided using the DSP and memory of the hands-free adapter. The user can send an incoming call to voice mail, rather than answer the call. If so, then the hands-free adapter plays an outgoing announcement to the caller and records a message from the caller.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention.

DESCRIPTION OF THE DRAWINGS

The above and other embodiments, objects, uses, advantages, and novel features are more clearly understood by reference to the following description taken in connection with the accompanying figures, wherein:

FIG. 6 is a diagram that illustrates an exemplary map of a voice command associated with a device command according to some of the embodiments of this invention.

FIG. 7 is a diagram that illustrates an exemplary map of a device event associated with an event indicator according to some of the embodiments of this invention.

FIG. 8 is a diagram that illustrates yet another exemplary map of a voice command associated with a device command according to some of the embodiments of this invention.

FIG. 9 is a diagram that illustrates yet another exemplary map of a device event associated with an event indicator according to some of the embodiments of this invention.

DESCRIPTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices for providing hands-free operation of a device. Briefly described, the invention provides a hands-free adapter that communicates with a device and/or with a headset. The hands-free adapter allows a user to use voice commands so that the user does not have to handle the device. The hands-free adapter receives voice commands and processes the voice commands to commands recognized by the device. The hands-free adapter also monitors the device to detect events of interest and provides notice of the events to the user (via the hands-free adapter or the headset). As used herein, the terms "user," "subscriber," and "individual" are used to describe one or more persons that may actively (e.g., by speaking voice commands) or passively interact with the hands free adapter and/or headset.

Figure 1:
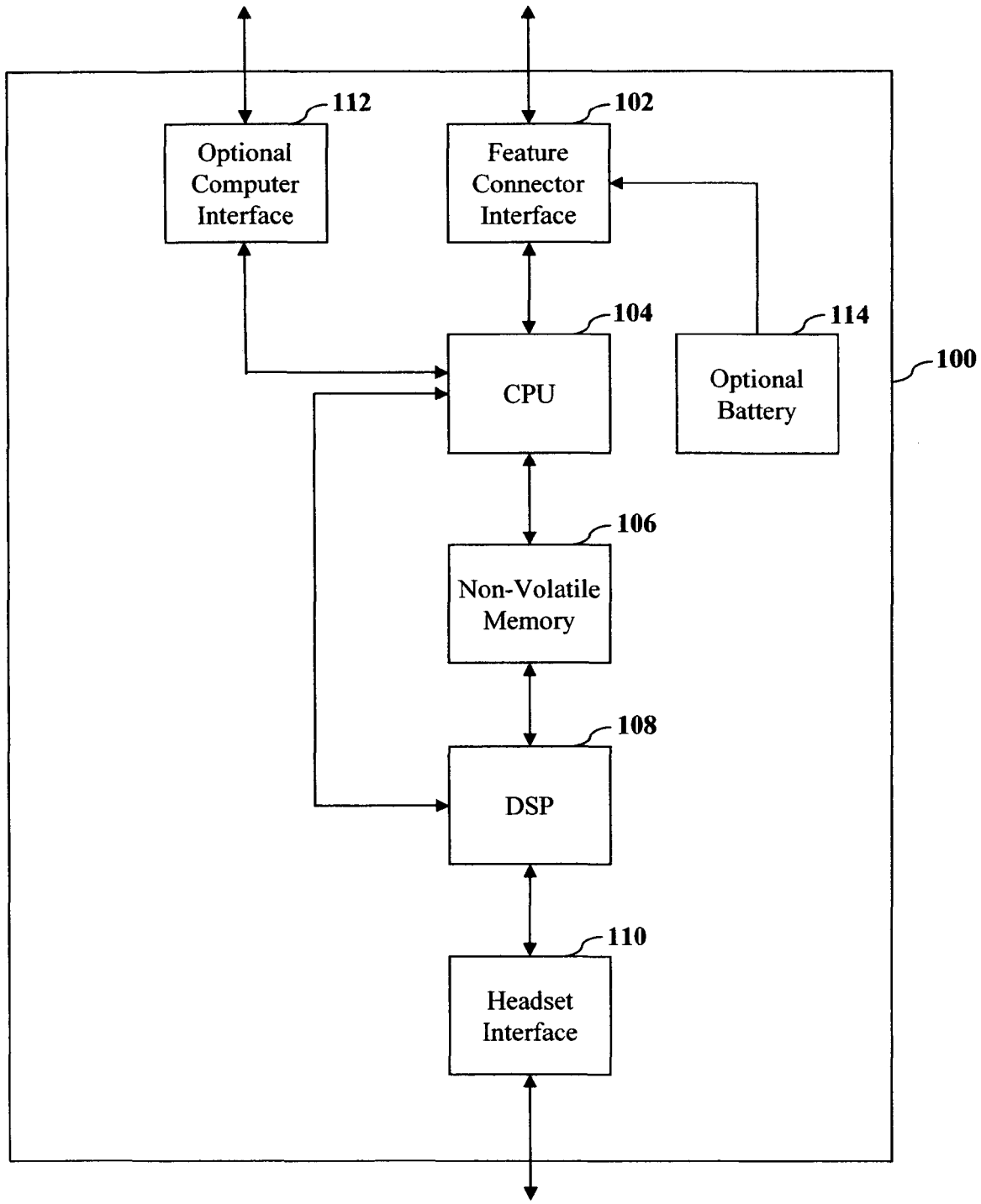
FIG. 1 is a block diagram of a hands-free adapter according to exemplary embodiments of this invention.

FIG. 1 is a block diagram of a hands-free adapter 100 according to exemplary embodiments of this invention. The hands-free adapter 100 includes a device interface 102 for interfacing with the device. The device interface 102 shown in FIG. 1 includes a feature connector interface (not shown) for interfacing with a mobile telephone. The terms "device interface" and "feature connector interface" are used interchangeably herein.

For example, many mobile or cellular telephones include a feature connector. The feature connector provides signals that indicate the status of the mobile telephone, such as incoming call, voice message, missed call, etc. The feature connector also provides the audio signals received by the mobile telephone. According to some of the embodiments, the feature connector transceives (i.e., transmits and receives) audio signals from the hands-free adapter 100 and the mobile telephone processes the audio signals in the same manner that it would process audio signals received from the microphone built into the mobile telephone. The feature connector also receives commands from the hands-free adapter 100 and the mobile telephone processes the commands in the same manner that it would process commands received from the keypad built into the mobile telephone. The feature connector also includes a power connection so that the mobile telephone can be powered via the power connection. Although most mobile telephones include a feature connector, the physical configuration of the feature connector and/or the communication protocol used by the feature connector may vary by model and/or manufacturer. Therefore, the device interface 102 shown in FIG. 1 may be customized for use with a particular manufacturer's device and/or with a particular type of communications device (e.g., cell phone, Voice over Internet Protocol (VoIP) phone, personal digital assistant (PDA), etc.).

According to some of the embodiments, if the hands-free adapter 100 interfaces with a wire line telephone, a pager or a personal digital assistant ("PDA"), then the hands-free adapter may be integrated into the device itself and the device interface 102 is not needed. And, according to further exemplary embodiments, the hands-free adapter 100 connects to an external interface of the device (e.g., a communications port of a computer, pager, PDA, etc).

The hands-free adapter 100 also includes a central processing unit (CPU) 104, non-volatile memory 106, a digital signal processor (DSP) 108, and a headset interface 110. Alternatively, the hands-free adapter 100 may include the communications components of a headset such that the hands-free adapter 100 itself processes commands from the user and communicates with the device. The non-volatile memory 106 stores a command prefix, voice commands, event indicators, and other information. According to some of the embodiments, a command prefix is a word, phrase, and or audible sound (e.g., a whistle) that provides an alert that a subsequent word or phrase is a command to control the device. For example, the command prefix may be a word that is not commonly used in conversation, such as "Goober." In further exemplary embodiments, the command prefix may be a change in speaking rhythm or pitch, a non-speech sound, or even a pause in the user's speech. According to still further exemplary embodiments, the command to control the device may be selected by the user. An example of a voice command may be "pick-up," "answer," "hello," or another expression that indicates an affirmative decision by the user to accept and establish a connection with an incoming communication. That is, for example, when the user says "goober, pick-up" the hands-free adapter 100 sends a device command to the device to answer the incoming communication. According to still further exemplary embodiments, an event of interest identifies an event indicator selected by the user for receiving information about the device. An example of an event indicator is an alert, such as, for example, a special tone or "sparkle" that is presented when the device receives an incoming communication (e.g., an incoming telephone call, an incoming email, an incoming text message, etc.). The non-volatile memory 106 also stores the software needed to operate the hands-free adapter 100, such as voice recognition software.

Figure 2:
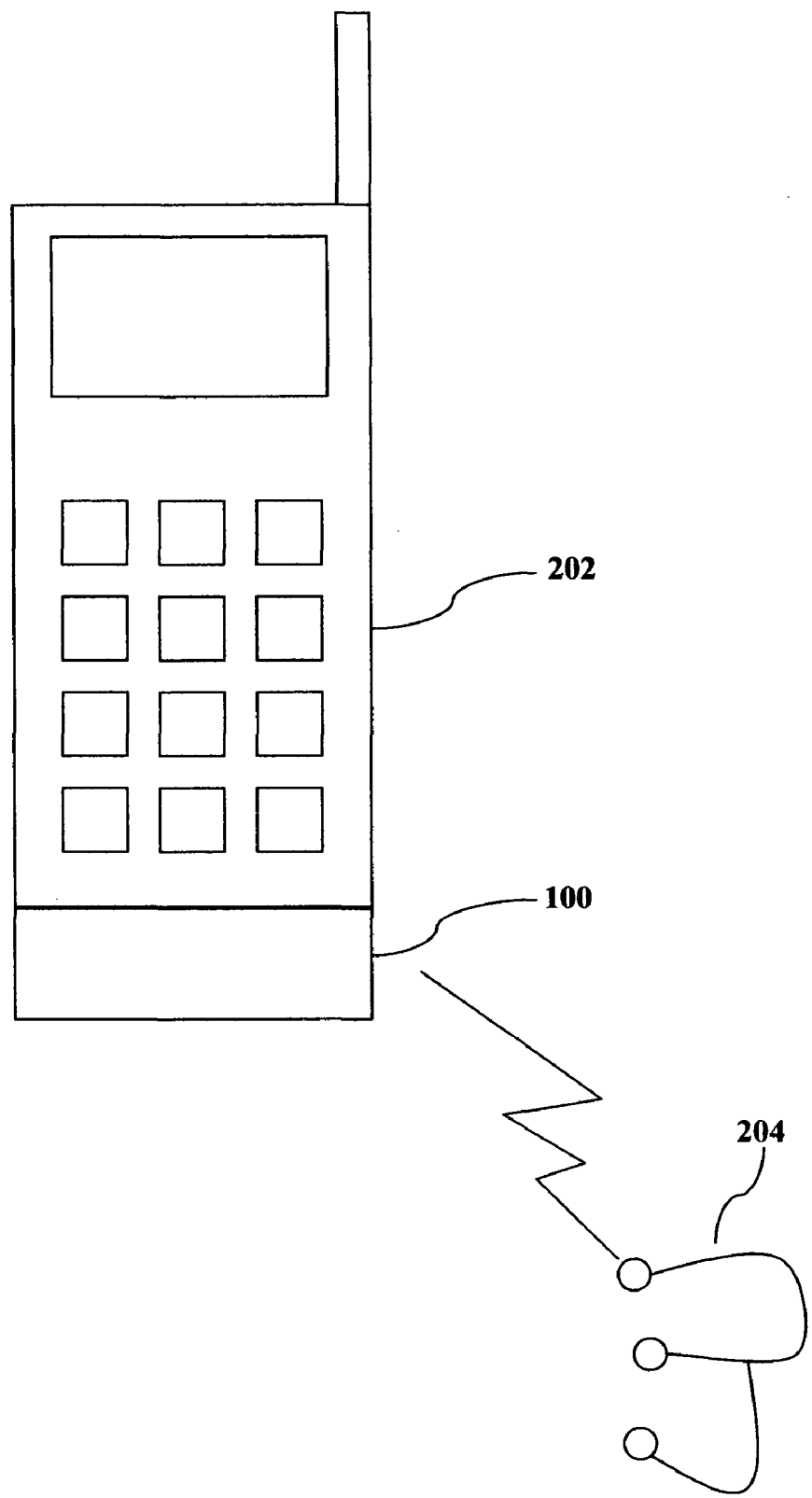
FIG. 2 is a schematic of an exemplary operating illustrating a hands-free adapter integrated with a cellular phone according to exemplary embodiments of this invention.

In accordance with the exemplary embodiments, the DSP 108 and the headset interface 110 may interface the hands-free adapter 100 with a headset (e.g., reference numeral 204 of FIG. 2). The hands-free adapter 100 communicates audio signals to the headset. For example, if the hands-free adapter 100 is connected to a mobile telephone, then the audio signals received by the telephone in connection with an incoming call are forwarded to the headset. If the hands-free adapter 100 is connected to a pager or a PDA, then the text messages received by the device are converted to audio signals and forwarded to the headset. The DSP 108 and headset interface 110 also provide event indicators to the headset. If the user selects an event indicator message that requires the generation of speech, then the DSP 108 performs the voice synthesis.

The audio signals received from the headset are processed by the DSP 108. If the audio signals are part of a telephone conversation, then the audio signals are passed through to the device itself. However, if the audio signals correspond to a voice command, then the voice command is recognized by the DSP 108 and is processed accordingly. In accordance with an exemplary embodiment, the interface 110 between the hands-free adapter 100 and the headset 204 is a wireless interface, such as Bluetooth, IEEE 802.11, or infrared optical signaling. In accordance with other exemplary embodiments, the interface 110 is a wired connection.

The hands-free adapter 100 of FIG. 1 includes an optional computer interface 112. The computer interface 112 allows the hands-free adapter 100 to communicate with a computer (not shown) using any of a variety of well-known protocols. The computer interface 112 may be used to configure and "train" the hands-free adapter 100 for voice recognition. In accordance with some of the embodiments, the voice recognition function of the hands-free adapter 100 are user-dependent and require training to recognize the voice commands issued by the user. In accordance with further exemplary embodiments, the voice recognition function is user-independent. Alternatively, the device interface 102 may be used instead of the computer interface 112 to interface the hands-free adapter 100 to the computer.

The computer interface 112 (or, alternatively, the device interface 102) may be used to configure the hands-free adapter 100. Configuration typically includes selecting features and programming user preferences into the non-volatile memory 106. Configuration may also include the selection of a language so that the hands-free adapter 100 is programmed to operate with a particular language (e.g., English, Spanish, etc.). Examples of features may include voice mail, caller identification, forwarding messages, storing messages, and others. Examples of user preferences may include voice commands and event indicators. The hands-free adapter 100 supports voice commands for creating a personal directory so that the user can associate an identifier, such as a name, with a destination communications address. Examples of destination communications address include a telephone number or an electronic data communications address, such as a pager or e-mail address. The computer interface 112 may also be used to transfer user preference information from one hands-free adapter 100 to another hands-free adapter (not shown), back up the user preference information, or add new features to the hands-free adapter 100.

An optional battery 114 is shown in the hands-free adapter 100 of FIG. 1. The hands-free adapter 100 is operational whenever the device is powered. The hands-free adapter 100 can share a battery, share a power source used by the device, or use the battery 114. In accordance with some of the embodiments, the battery 114 provides power to the hands-free adapter 100 and may also provide a back-up power source for the device. According to the exemplary embodiments, if the device is a mobile telephone, then the hands-free adapter 100 may be built into a battery pack.

The components shown in FIG. 1 are exemplary. Additional and/or alternative components may also be used. Although separate components are shown in FIG. 1, the components may be integrated into one or more components. For example, Motorola provides the MC9328MX1 processor that includes a microprocessor, memory controller, BLUETOOTH accelerator and multimedia accelerator that could be used in the hands-free adapter 100.

FIG. 2 illustrates the hands-free adapter 100 connected to a mobile telephone 202 via the feature connector of the mobile telephone 202. Although the interface between the device 202 and the hands-free adapter 100 is shown as a wired interface in FIG. 2, the interface may also be a wireless interface as well understood by those of ordinary skill in the art. The hands-free adapter 100 communicates with a headset 204. The headset 204 includes a speaker and a microphone. The headset 204 may be a conventional headset or can be integrated into another article, such as a pair of glasses, a glasses' strap, a hat, or a vehicle. If the headset 204 is integrated into a vehicle, then the vehicle may provide a docking station for the device and a microphone and use the existing speakers provided by the audio system. And, further exemplary embodiments include the headset 204 as an integrated component of the hands-free adapter 100.

If the hands-free adapter 100 is used with a landline telephone, then the hands-free adapter 100 is typically connected to the landline telephone as either an add-on component or an integrated component. In accordance with an exemplary embodiment, the hands-free adapter 100 may be integrated into the base of a cordless landline telephone.

The hands-free adapter 100 is powered whenever the device, such as the mobile telephone 202, is powered so that the hands-free adapter 100 may be used to perform any function or command that is normally performed by a user interacting with the device. The hands-free adapter 100 monitors the device via the device interface 102 and monitors the headset 204 via the headset interface 110. Whenever the hands-free adapter 100 detects an event of interest, the hands-free adapter 100 notifies the user by sending an event indicator to the headset 204. The event indicator may be a message, such as a message previously recorded by the user during configuration or a standard message, or a tone or series of tones. For example, a message stating "incoming call" can be used to alert the user to an incoming call. Alternatively, a particular tone or "sparkle" can be used to alert the user to an incoming call. And, in some of the embodiments, the event indicator is overlaid on any existing communication (e.g., during a conversation between the user and a calling party) and is only played to the user. For example, if the user is participating in a telephone conversation when the hands-free adapter 100 detects the event, such as incoming call waiting, then the event indicator is provided to the user and is not detectable by the original caller.

In accordance with some of the embodiments, the hands-free adapter 100 does not modify any of the device settings. Therefore, if the device is the mobile telephone 202 and the ringer is activated, then the telephone rings whenever an incoming call is received. In addition, the hands-free adapter 100 sends an incoming call alert to the user via the headset. And, in accordance with some of the embodiments, the hands-free adapter 100 may not disable a keypad of the device. Therefore, the user can use either the headset 204 or the keypad depending upon which is most convenient.

In accordance with some of the embodiments, a toggle switch is provided on the headset 204 to allow the user to send a command to the device. The toggle switch allows the user to answer an incoming call or to disconnect from a call. The toggle switch may be useful in a noisy environment where a voice command may not be easily recognized.

The exemplary embodiments include a command prefix that is used in addition to a command to control the device so that a user does not inadvertently cause the device to perform an unintended action. The command prefix may be provided by the manufacturer or selected by the user. According to some of the embodiments, the command prefix is a word, phrase, or audible sound that the user does not routinely use in conversation. To issue a command, the user says both the command prefix and a command. The command prefix can be selected during configuration of the hands-free adapter 100. When the hands-free adapter 100 detects the command prefix, the hands-free adapter 100 treats the next word as a command. In addition, if the hands-free adapter 100 is passing audio signals from the headset 204 to the device, then the hands-free adapter 100 mutes the audio to the device, so that the voice command is not provided to the device. For example, if the user selects "goober" as the command prefix, then the user says "goober" before each voice command. This allows the user to use a voice command in conversation without triggering a device command because the voice command is only effective if the voice command is preceded by the command prefix. Thus, if "hang up" is a voice command to disconnect a call, then the user says "goober, hang up" to hang up the device. Conversely, if the user uses the phrase, "hang up" in normal conversation without the command prefix, then the hands-free adapter 100 does not interpret "hang-up" as a voice command. According to alternate embodiments, the command prefix may include alternate triggers, such as, for example, body movement (e.g., hand, eyes, head, etc.).

In accordance with some of the embodiments, a command prefix is not required for all commands. That is, the hands-free adapter 100 uses context to recognize a command. For example, if an incoming call is detected, then the hands-free adapter 100 expects to receive a voice command. Consequently, if the user says "pick up," then the hands-free adapter 100 recognizes a portion of the voice command (i.e., the command to control the device) and interprets the input as a command to answer the call. The hands-free adapter 100 then notifies the user of the interpretation and prompts the user to confirm execution of the command. For example, if the user says "pick up" during an incoming call, then the hands free adapter 100 may inquire "do you want to answer the incoming call?" If the user says "yes" or otherwise affirmatively responds, the device interface instructs the mobile telephone to answer the call.

Figure 3:
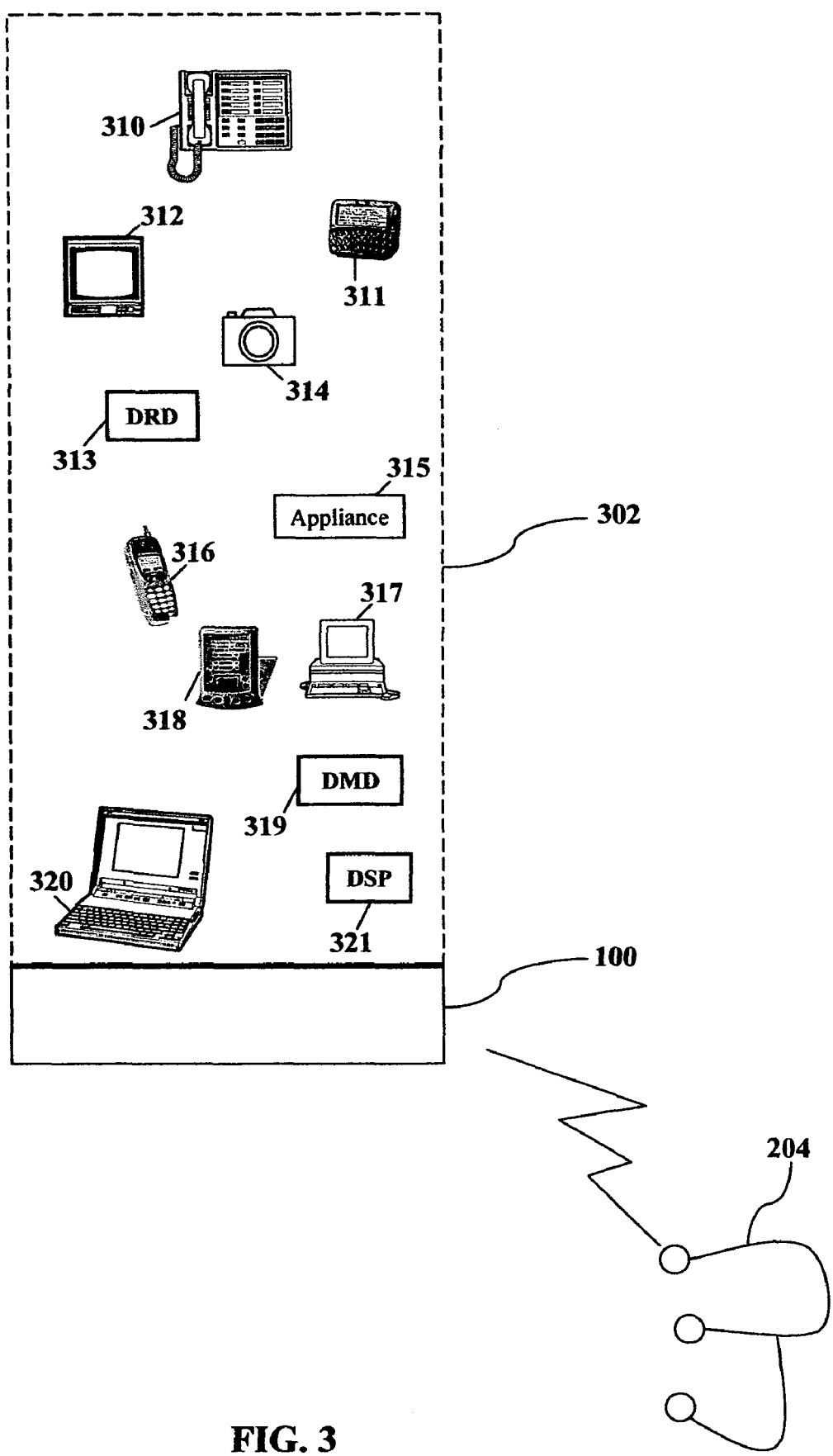
FIG. 3 is a schematic of an exemplary operating illustrating a hands-free adapter integrated or otherwise communicating with alternative devices according to exemplary embodiments of this invention.

FIG. 3 illustrates the hands-free adapter 100 connected to alternate devices 302 via the device interface 102. According to these exemplary embodiments, the alternate devices 302 may include a landline phone 310, an interactive pager 311, a television 312, a digital recording device 313, a digital camera 314, an appliance 315 (e.g., a washer, a dryer, a refrigerator, etc.), a VoIP phone 316, a computer system 317, a personal digital assistant (PDA) 318, a digital music device 319, a portable computer system, and any device having a digital signal processor (DSP) 321.

Figure 4:
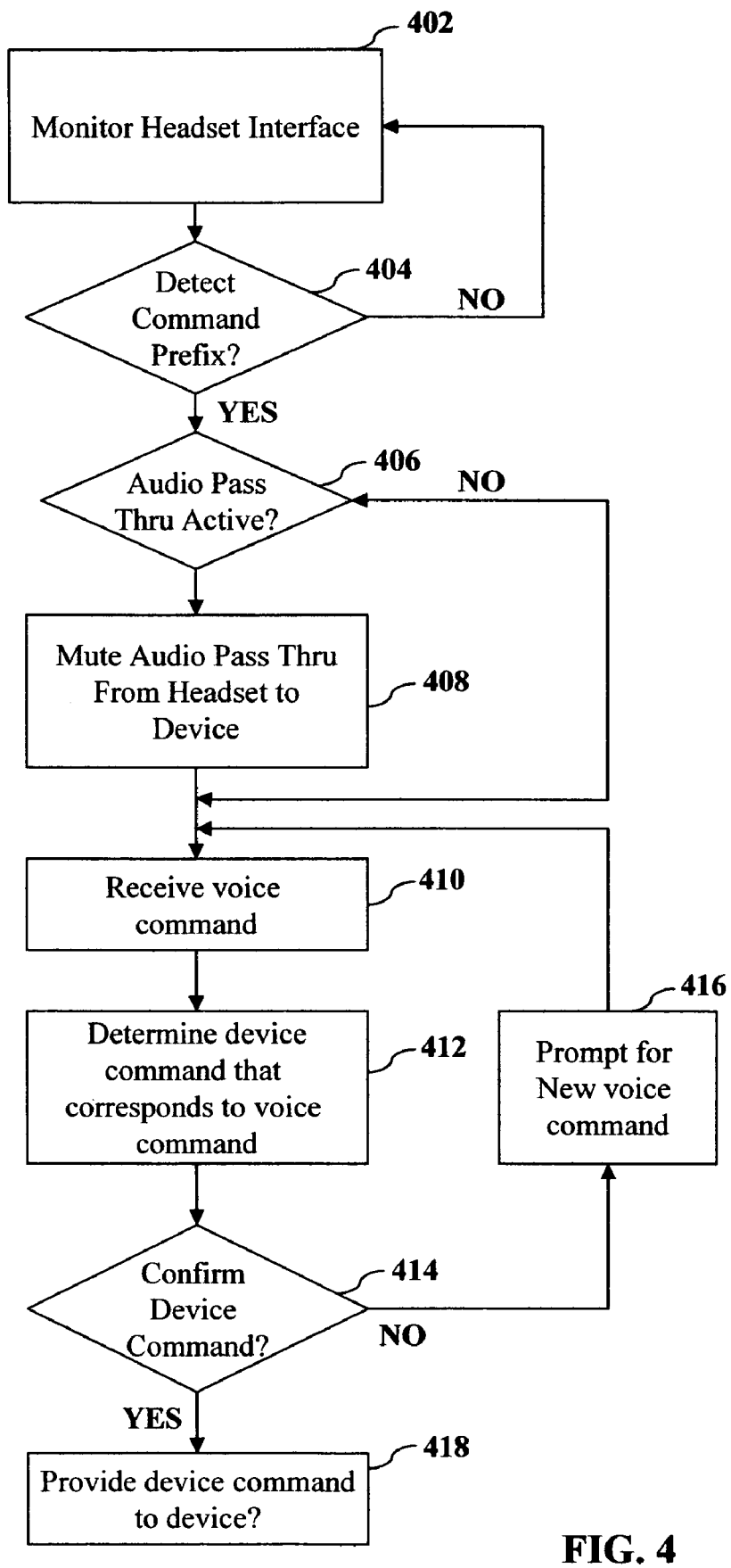
FIG. 4 is a flow chart illustrating a method for generating a device command according to exemplary embodiments of this invention.

FIG. 4 illustrates an exemplary method for handling voice commands. In step 402, the hands-free adapter 100 monitors the headset interface 110 (or alternatively the hands-free adapter itself) for audio signals. As audio signals are received, the hands-free adapter 100 analyzes the audio signals in step 404 to determine whether the audio signals correspond to a command prefix. If a command prefix is not detected, then the "No" branch proceeds back to step 402 and the hands-free adapter 100 continues to monitor the audio signals received from the headset 204. If a command prefix is detected, then the "Yes" branch proceeds to step 406.

In step 406, a determination is made as to whether audio signals are being passed from the headset 204 to the device. For example, if the device is a mobile telephone, then audio signals are passed from the headset 204 to the mobile telephone 202 during a telephone conversation. If audio signals are being passed to the device, then the "Yes" branch proceeds to step 408 and the audio signals are muted in step 408 so that the voice command is not forwarded to the device. From step 408, the method proceeds to step 410. If the determination in step 406 is that audio signals are not being passed to the device, then the "No" branch is followed to step 410. In step 410, the hands-free adapter 100 receives the voice command. The hands-free adapter 100 determines the device command that corresponds to the voice command in step 412. In step 414, a determination is made whether to confirm the device command. If the decision is to confirm the device command, then the "Yes" branch is followed to step 416 to prompt the user to confirm or to provide a new voice command. Thereafter, the method continues back to step 410. If, however, the determination is made to not confirm the device command in step 414, then the method continues with step 418 and sends the device command to the device via the device interface.

Figure 5:
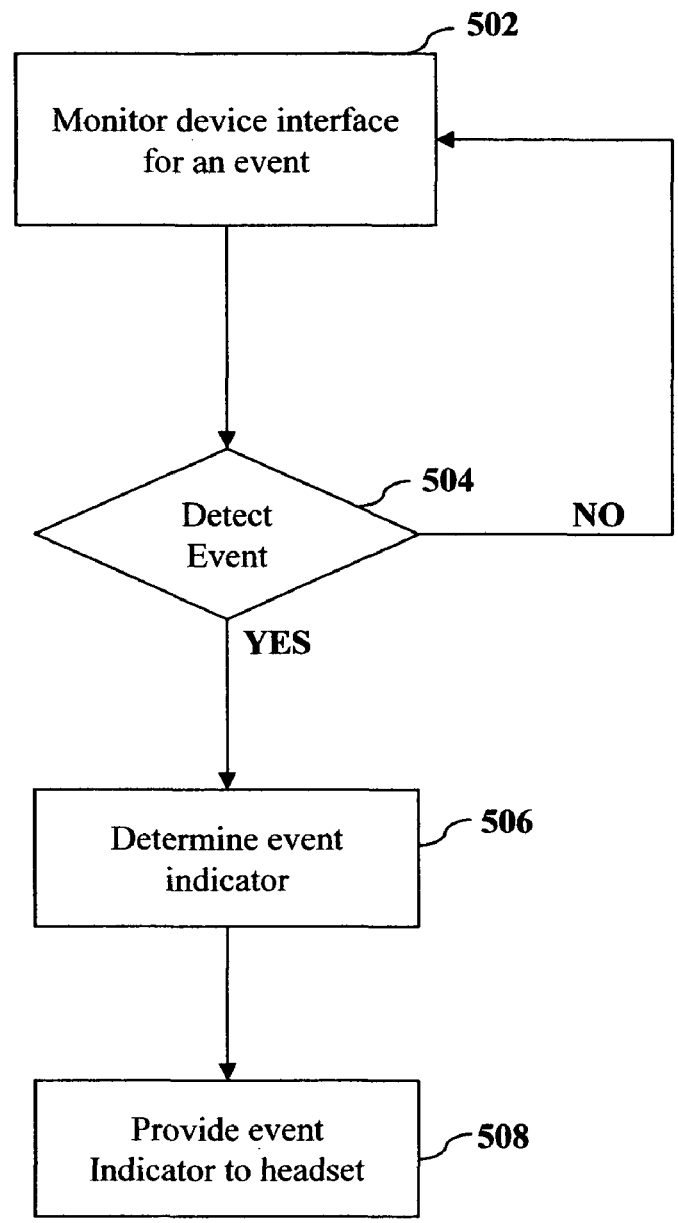
FIG. 5 is a flow chart illustrating a method for providing an event indicator according to exemplary embodiments of this invention.

FIG. 5 illustrates an exemplary method for providing event indicators. The hands-free adapter 100 monitors the device interface 102 for an event in step 502. Typically, the events are predefined. For example, if the device is a mobile telephone, then the feature connector is monitored to detect an incoming call. If an event is not detected in step 504, then the No branch is followed to step 502 and monitoring continues. If an event is detected in step 504, then the Yes branch is followed to step 506. In step 506, an event indicator is determined. Typically, the user selects the event indicator during configuration of the hands-free adapter 100 and the event indicator is stored in the memory of the hands-free adapter. Once the event indicator is determined, the hands-free adapter 100 provides the event indicator to the headset 204 via the headset interface 110 in step 508.

FIG. 6 illustrates an exemplary map of a voice command associated with a device command according to some of the embodiments for a mobile telephone. As discussed above, the voice commands typically are selected by the user during configuration of the hands-free adapter 100 and stored in memory. A "pick up" command 602 instructs the hands-free adapter 100 to generate a command to the mobile telephone 202 to answer an incoming call. A "hang-up" command 604 instructs the hands-free adapter 100 to generate a command to the mobile telephone 202 to disconnect a call.

A "Joe" command 606 instructs the hands-free adapter 100 to generate a command to the mobile telephone 202 to dial XXX.XXX.XXXX. A "Hair Salon" command 608 instructs the hands-free adapter to generate a command to the mobile telephone to dial YYY.YYY.YYYY. The entries for "Joe" and "Hair Salon" correspond to the user's personal directory. The user can select a voice command that identifies a person or business and corresponds to a telephone number, such as "Joe"—XXX.XXX.XXXX or "Hair Salon"—YYY.YYY.YYYY. The user uses these voice commands in combination with another voice command, such as a "dial" command 610 to place a call. For example, if the user says, "Goober, Dial Joe," then the hands-free adapter 100 generates a device command that cause the device to place a call to XXX.XXX.XXXX. If the hands-free adapter 100 detects an incoming call from one of the telephone numbers stored in its memory, then the hands-free adapter identifies the caller to the user. For example, if the event indicator for an incoming call is "incoming call," then an incoming call from XXX.XXX.XXXX is announced as "incoming call from Joe."

The user may refer to the same person or business using multiple identifiers. For example, the user may refer to Joe, as Joe and Joey. If so, then a "Joey" command may be a separate command or may be a pointer to the "Joe" command.

The "Dial" command 610 instructs the hands-free adapter 100 to wait for digits or a voice command and to generate a command to the mobile telephone 202 to place an outgoing call. An "Ignore" command 612 instructs the hands-free adapter 100 to ignore the event so that no device command is generated. For example, the user may not want to answer an incoming call. If so, then when the hands-free adapter 100 notifies the user of the incoming call, the user says "Goober, Ignore" and the hands-free adapter does not provide any additional notifications of the incoming call or provide a device command to the mobile telephone.

An "Okay" command 614 instructs the hands-free adapter 100 to generate a send command to the mobile telephone device 202. The "Okay" command 614 can be used to indicate that a dialing sequence is complete. For example, the user can dial a seven-digit number by saying, "Goober, Dial ZZZ.ZZZZ, Okay" or dial a ten-digit number by saying "Goober, Dial ZZZ.ZZZ.ZZZZ, Okay."

In accordance with some of the embodiments, the "Okay" command 614 is used to confirm dialing instructions. For example, the user provides dialing instructions to the hands-free adapter 100 by saying, "Goober, Dial ZZZ.ZZZ.ZZZZ, Okay." In response, the hands-free adapter 100 provides a dialing confirmation messages, such as "Dialing ZZZ.ZZZ.ZZZZ." The user confirms the dialing instructions by saying, "Goober, Okay." Once the user confirms the dialing instructions, the hands-free adapter 100 provides the dialed number and a send command to the mobile telephone 202. If the user does not want to place the call, then the user does not respond, and the hands-free adapter 100 does not send the digits to the mobile telephone 202.

If the number being dialed is in the personal directory, then the hands-free adapter 100 can use the personal directory to identify the person or business that is being called. For example, if the user says, "Goober, Dial XXX.XXX.XXXX," then the hands-free adapter 100 can provide a dialing confirmation message of "Dialing Joe."

A "Voice Mail" command 616 is used with the voice mail provided by the hands-free adapter 100. The "Voice Mail" command 616 instructs the hands-free adapter 100 to generate a command to the mobile telephone 202 to answer an incoming call. However, instead of the user participating in the call, the hands-free adapter 100 plays an outgoing announcement to the caller and records a message from the caller. The "Voice Mail" command 616 provides voice mail to the user regardless of the availability of network voice mail. If voice mail is provided, then additional voice mail commands (not shown) are also needed to access the voice mail functions. For example, commands to play a message and delete a message are needed.

A "Create Directory Entry" command 618 is used to create a new voice command that corresponds to the user's personal directory. For example, if the user says, "Goober, create directory entry for Susan ZZZ.ZZZ.ZZZZ," then the hands-free adapter 100 creates a new voice command "Susan" that corresponds to ZZZ.ZZZ.ZZZZ.

A "Sleep" command 620 is used to place the hands-free adapter 100 in sleep mode. While in sleep mode, the hands-free adapter 100 does not provide any event indicators. Sleep mode may be used when the user does not want to be interrupted. A "Wake up" command 622 is used to place the hands-free adapter 100 in its normal mode. Other commands may include a "Stop" command 624 to discontinue an activated command, a "Record" command 626 to record an audio message by the user, an "Activate" command 628 to power on the device, a "Deactivate" command 630 to power off the device, a "Hang up" command 632 to disconnect the calling party, and an "Unrecognized voice command" 640 to alert the user of an error and prompt for an associated voice command and/or device command. Those of ordinary skill in the art understand that voice commands other than those illustrated in FIG. 6 are possible. For example, a voice command or a set of voice commands to support three-way calling can be included.

FIG. 7 illustrates an exemplary map of a device event associated with an event indicator for a mobile telephone. As discussed above, the event indicators typically are selected by the user during configuration of the hands-free adapter 100 and stored in memory. An "Incoming call" event 702 instructs the hands-free adapter 100 to play a message that states, "Incoming call" when the hands-free adapter 100 detects that there is an incoming call on the mobile telephone. Typically, the incoming call message is played every time that the hands-free adapter 100 detects a ring tone. An "Incoming call waiting" event 704 instructs the hands-free adapter 100 to play a message that states, "Incoming call waiting" when the hands-free adapter detects that there is an incoming call waiting on the mobile telephone. Although not shown in FIG. 7, if the hands-free adapter 100 provides voice mail, then an event indicator indicating the receipt of a message may also be included. Those of ordinary skill in the art understand that event indicators other than those illustrated in FIG. 7 are possible.

FIG. 8 illustrates some exemplary voice commands that may be used with an interactive pager, PDA, SMS enabled mobile telephone, and other electronic data devices. A "Read" command 802 instructs the hands-free adapter 100 to retrieve a message from a data device, such as a pager, and to play or read the message to the user. The "Reply" command 804 instructs the hands-free adapter to generate a command to the pager to send a reply message. The user provides the text of the reply message. For example, the user says, "Goober, Reply yes" to send a reply message that states "Yes." The "Delete command 806 instructs the hands-free adapter 100 to generate a delete command to the pager to delete a message. A "Joe" command 808 instructs the hands-free adapter 100 to generate a command to the pager to send a message to joe@ipager.com. The user supplies the text for the message. The user can create a personal directory of pager addresses in a manner similar to that described above in connection with a personal directory of telephone addresses. The personal directory can be used by the hands-free adapter 100 to announce that a "New message from Joe" has been received. Those of ordinary skill in the art understand that voice commands other than those illustrated in FIG. 8 are possible. For example, a voice command or a set of voice commands to activate 810 and deactivate 812 the communications device (e.g., mobile telephone, pager, etc.) forward 814 the message, copy 816 the reply message to another communications address, store (not shown), or otherwise manage a message may be included.

FIG. 9 illustrates some exemplary event indicators for an interactive pager, PDA, SMS enabled mobile telephone, or other electronic data devices. A "New Message" event 904 instructs the hands-free adapter 100 to play a message that states, "New message" when the hands-free device adapter determines that a new message has been received by the pager. Those of ordinary skill in the art understand that event indicators other than those illustrated in FIG. 9 are possible.

The methods for using the hands-free adapter 100 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the computer-readable medium to be easily disseminated.

Furthermore, the methods for using the hands free adapter 100 may also be physically embodied on or in any addressable (e.g., HTTP, I.E.E.E. 802.11, Wireless Application Protocol (WAP)) wireline or wireless device capable of presenting an IP address. Examples could include a computer, a wireless personal digital assistant (PDA), an Internet Protocol mobile phone, or a wireless pager.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

What is claimed:

1. A hands-free adapter, comprising:
   a device interface for interfacing the hands-free adapter to a communications device;
   a headset interface for interfacing the hands-free adapter to a hands-free headset;
   a memory storing a command prefix and a subsequent voicemail command; and
   a processor detecting the command prefix and the voicemail command, the processor generating a device command to answer an incoming call.

2. The hands-free adapter of claim 1, wherein the communications device comprises a phone.

3. The hands-free adapter of claim 1, wherein the communications device comprises at least one of a cellular phone, a voice-over internet protocol phone, a telephone, and a wireless phone.

4. The hands-free adapter of claim 1, wherein the communications device comprises at least one of a computer, a digital music device, a digital recording device, a personal digital assistant, an interactive television, and a digital signal processor.

5. The hands-free adapter of claim 1, wherein the processor connects an incoming communication to the hands-free headset to establish a communications connection.

6. The hands-free adapter of claim 5, wherein the processor communicates an outgoing announcement via the communications connection.

7. The hands-free adapter of claim 6, wherein the processor stores a message to the memory.

8. The hands-free adapter of claim 1, wherein the processor processes the voicemail command to emulate a user's interaction with a voice messaging feature.

9. A method for providing hands-free operation of a device, comprising:
   monitoring a hands-free adapter for a command prefix and a subsequent voicemail command; and
   in response to detecting the voicemail command, generating a device command by a processor that answers an incoming call.

10. The method of claim 9, further comprising:
    establishing a communications connection between the hands-free adapter and the device.

11. The method of claim 10, wherein the communications connection comprises a video communications connection.

12. The method of claim 10, wherein the communications connection comprises a data communications connection.

13. The method of claim 10, wherein the communications connection comprises an audio communications connection.

14. The method of claim 9, further comprising:
    monitoring the device for an event of interest comprising at least one of a status of the device, a functionality of the device, and a capability of the device;
    in response to detecting the event of interest, generating an event indicator; and
    providing the event indicator to the hands-free adapter.

15. The method of claim 9, further comprising presenting a notification that the voicemail command has been detected.

16. A storage medium on which is encoded instructions for performing a method, the method comprising:
    monitoring a hands-free adapter for a command prefix and a subsequent voicemail command, the command prefix being at least one spoken word that is used to identify subsequently spoken voice commands that control a device, the voicemail command only being effective when preceded by the spoken command prefix; and
    in response to detecting the voicemail command, generating a device command by a processor that answers an incoming call.

17. The storage medium of claim 16, further comprising instructions for establishing a communications connection between the hands-free adapter and a communications device.

18. The storage medium of claim 16, further comprising instructions for performing the following:
    monitoring the device for an event of interest comprising at least one of a status of the device, a functionality of the device, and a capability of the device;
    in response to detecting the event of interest, generating an event indicator; and
    providing the event indicator to the hands-free adapter.

19. The storage medium of claim 16, further comprising instructions for presenting a notification that the voicemail command has been detected.

* * * * *